(12) United States Patent
Canard et al.

(10) Patent No.: US 7,840,813 B2
(45) Date of Patent: Nov. 23, 2010

(54) METHOD AND SYSTEM WITH AUTHENTICATION, REVOCABLE ANONYMITY AND NON-REPUDIATION

(75) Inventors: Sébastien Canard, Caen (FR); Stéphane Guilloteau, Douville Enauge (FR); Eric Malville, Bayeux (FR); Jacques Traore, Saint Georges des Groseillers (FR)

(73) Assignee: France Telecom, Paris (FR)

( * ) Notice: Subject to any disclaimer, the term of this patent is extended or adjusted under 35 U.S.C. 154(b) by 978 days.

(21) Appl. No.: 10/534,857

(22) PCT Filed: Nov. 14, 2003

(86) PCT No.: PCT/FR03/03380

§ 371 (c)(1),
(2), (4) Date: May 13, 2005

(87) PCT Pub. No.: WO2004/047362

PCT Pub. Date: Jun. 3, 2004

(65) Prior Publication Data

US 2006/0155985 A1   Jul. 13, 2006

(30) Foreign Application Priority Data

Nov. 14, 2002  (FR) .................................. 02 14230

(51) Int. Cl.
*H04L 9/32* (2006.01)

(52) U.S. Cl. ...................... 713/176; 713/156; 713/180; 726/9; 726/10; 705/37; 705/74

(58) Field of Classification Search ................ 380/277; 703/17; 705/26, 37, 44, 64, 74, 76, 401; 707/9, 202; 709/221, 225; 713/155, 156, 713/158, 168, 170, 172, 180; 726/10, 27
See application file for complete search history.

(56) References Cited

U.S. PATENT DOCUMENTS

| | | | | |
|---|---|---|---|---|
| 5,815,665 | A | * | 9/1998 | Teper et al. .................. 709/229 |
| 6,055,518 | A | * | 4/2000 | Franklin et al. ............... 705/37 |
| 6,154,841 | A | * | 11/2000 | Oishi .......................... 713/180 |
| 6,363,365 | B1 | * | 3/2002 | Kou ............................. 705/64 |
| 6,397,329 | B1 | * | 5/2002 | Aiello et al. ................. 713/155 |
| 7,234,059 | B1 | * | 6/2007 | Beaver et al. ................ 713/170 |

(Continued)

OTHER PUBLICATIONS

Leslie Lamport, Password Authentication with Insecure Communication, Communications of the ACM, v.24 n. 11, p. 770-772, Nov. 1981.*

(Continued)

*Primary Examiner*—William R Korzuch
*Assistant Examiner*—Michael R Vaughan
(74) *Attorney, Agent, or Firm*—Cohen Pontani Lieberman & Pavane LLP

(57) ABSTRACT

The present invention relates to a method of access to a service consisting in i) identifying and registering a client (C), ii) authenticating the client to an anonymous certification authority, iii) authenticating the client by producing an anonymous signature and opening and maintaining an anonymous authentication session with a server (Se), and iv) selectively allowing contact between the server (Se) and the anonymous certification authority (ACA) to revoke the anonymity of the client (C) using the signature provided in step iii). The invention also relates to a system for opening and maintaining an authentication session guaranteeing non-repudiation.

18 Claims, 11 Drawing Sheets

U.S. PATENT DOCUMENTS

| | | | | |
|---|---|---|---|---|
| 7,366,897 | B2* | 4/2008 | Noble | 713/156 |
| 2001/0011351 | A1* | 8/2001 | Sako | 713/180 |
| 2001/0027431 | A1* | 10/2001 | Rupp et al. | 705/37 |
| 2001/0027519 | A1* | 10/2001 | Gudbjartsson et al. | 713/168 |
| 2002/0007457 | A1* | 1/2002 | Neff | 713/180 |
| 2002/0085713 | A1* | 7/2002 | Feig et al. | 380/200 |
| 2002/0087473 | A1* | 7/2002 | Harif | 705/44 |
| 2002/0103999 | A1* | 8/2002 | Camnisch et al. | 713/155 |
| 2003/0005118 | A1* | 1/2003 | Williams | 709/225 |
| 2003/0014631 | A1* | 1/2003 | Sprague | 713/168 |
| 2003/0028470 | A1* | 2/2003 | Dutta | 705/37 |
| 2003/0158960 | A1* | 8/2003 | Engberg | 709/237 |
| 2003/0172269 | A1* | 9/2003 | Newcombe | 713/168 |
| 2003/0190046 | A1* | 10/2003 | Kamerman et al. | 380/286 |
| 2006/0184681 | A1* | 8/2006 | Bernardi et al. | 709/229 |
| 2008/0215476 | A1* | 9/2008 | Rabenold et al. | 705/37 |

OTHER PUBLICATIONS

K.Q. Nguyen, J. Traore. An Online Public Auction Protocol Protecting Bidder Privacy. Information Security and Privacy, 5th Australasian Conference—ACISP 2000, pp. 427-442. Springer-Verlag, 2000.*

K. Kobayashi et al., "Efficient Sealed-Bid Auction by Using One-Way Functions", IEICE Transactions of Fundamentals of Electronics, Communications and Computer Sciences, Institute of Electronics Information and Comm. Eng. vol. E84-A, No. 1, pp. 289-294, Jan. 1, 2001.

K. Suzuki, et al., "Efficient sealed-bid auction using hash chain", Information Security and Cryptology—ICISC 2000, Third International Conference, Proceedings (Lecture notes in Computer Science) vol. 2015, Springer Verlag, pp. 183-191, Dec. 9, 2000.

Lee Byoungcheon, et al., "Efficient Public Auction with One-Time Registration and Public Verifiability", Indocrypt 2001, Second International Conference on Cryptology in India, pp. 162-174, Dec. 16-20, 2001.

N. Zhang et al., "Anonymous public-key certificates for anonymous and fair document exchange", IEEE Proceedings, Communications Institution of Electrical Engineers, GB, vol. 147, No. 6, pp. 345-350, Dec. 11, 2000.

R. Rivest et al., "Pay Word and Micromint: Two Simple Micropayment Schemes", Security Protocols, International Workshop Proceedings, XX, 1997 pp. 69-87.

* cited by examiner

METHOD AND SYSTEM WITH AUTHENTICATION, REVOCABLE ANONYMITY AND NON-REPUDIATION

This is a U.S. national stage of application No. PCT/DE2003/003380, filed on 14 Nov. 2003.

TECHNICAL FIELD

The invention relates to a method of secure access to services, in particular to a method of secure access to data processing resources.

A general objective of the invention is to offer a strong and anonymous user authentication service and a fast and economical mechanism for maintaining session authentication. Despite user anonymity, the invention makes users responsible for their actions by offering to the resources accessed the possibility of revoking user anonymity if necessary (for example in the event of a dispute).

The invention may find numerous applications. Those indicated hereinafter must not be considered as limiting the invention.

The major applications of the present invention are electronic bidding and networked/community games. In fact, the invention is particularly suitable for any application whose object is to offer a public space in which a plurality of users may meet and communicate anonymously.

The invention is particularly pertinent in the case of electronic bidding, where the object is to reproduce the principle of real bidding, enabling persons gathered together in the same room to make bids anonymously. Although their identity is never revealed, participants cannot repudiate their bids. The present invention offers the same properties of anonymous authentication and non-repudiation.

The same functions can also be used for multiplayer games applications, such as casino games, in which a plurality of persons gather around the same gaming table without knowing each other. If a player bets on a number, he is not able to repudiate the bet. The present invention offers these properties: it guarantees player anonymity (the identity of the players is not revealed) whilst making them responsible for their actions (the identity of the players can be revealed if necessary).

DESCRIPTION OF THE PRIOR ART

The general object of the invention is to propose means for 1) guaranteeing the anonymity of clients, 2) maintaining an authentication session effectively, and 3) making clients responsible for their actions.

A certain number of existing techniques satisfy some of the above requirements, but none offers a complete solution to the overall problem.

Certain techniques enable a server to authenticate a client and are generally linked to a mechanism for maintaining an authentication session between the user and the server.

The following are the major techniques offering authentication and session maintaining services: 1) one-time passwords, 2) the SSL and TLS techniques, and 3) the Kerberos technique.

One-time passwords: the principle of one-time passwords (OTP) is to use passwords that can be used once only. Even if the password is revealed, it cannot be used again. In practice, this device generally takes the form of a card reader resembling a pocket calculator, for example an ActivCard or SecurID card reader, which calculates passwords that users must enter to authenticate themselves. The password is then used to calculate a session key (secret key) intended to guarantee the confidentiality and integrity of communication.

SSL and TLS techniques: these techniques are based on certificates and public key (asymmetrical) cryptography algorithms for authentication and secret key (symmetrical) cryptography algorithms for session maintenance. A certificate constitutes a digital identity card. It takes the form of a file containing a public key and information on its proprietor. That information is certified (i.e. signed) by a trusted authority known as the certification authority. To authenticate a user, a server typically sends him a challenge (a random numerical value) that the user signs using his private key. The public key enables the server to verify that the user holds the private key and enables the certificate to know the identity of the user. Moreover, this authentication stage enables the client and the server to exchange a session key (secret key) that will enable them to guarantee the confidentiality and integrity of communication between them.

Kerberos technique: this is a single sign-on (SSO) mechanism enabling a user to access a plurality of resources without having to authenticate himself more than once. It is based on secret key cryptography algorithms. To access a server, the user typically authenticates himself to a key distribution centre (KDC) which sends him an authentication token for the target server. The token is sent in a manner that is transparent to the target server and enables it to identify/authenticate the user and to recover a session key (secret key) used by the server and the client to guarantee the confidentiality and integrity of communication between them.

The major drawbacks of the above prior art techniques are as follows:

The anonymity of users is not preserved: the authentication mechanisms of the above techniques are intended to verify the real identity of the client. That identity is revealed by the login in the case of one-time passwords, by the certificate in the case of the TLS and SSL techniques, and by the authentication token in the case of the Kerberos technique.

Non-repudiation is not guaranteed: the above techniques use secret key cryptography algorithms to maintain the authentication session and to guarantee the confidentiality and integrity of communication. That type of cryptography algorithm cannot guarantee non-repudiation. The client can always deny having sent a message.

Maintaining the session is costly: the session is maintained by encrypting or authenticating the messages that the client and the server exchange. The client must have calculation means available at all times to maintain the session.

Other techniques offer authentication mechanisms that preserve the anonymity of users.

The use of a pseudonym is the approach most widely adopted by the servers currently deployed on the Internet (e.g. electronic bidding sites, games sites). This technique is based on an authentication mechanism based on the use of a login name (i.e. a pseudonym) and a password. Users generally register with the server by giving certain personal information and choosing a pseudonym and a password that they must then enter to authenticate themselves. This approach gives rise to a certain number of problems:

Ergonomic problem: each user must register with each of the servers, which involves entering the same information several times.

Anonymity problem: personal information on users is stored on each server. The anonymity of a user is guaranteed with respect to other users but not with respect to the server. The user must therefore have total confidence in each of the service providers.

Identification and responsibility problem: information given by the user is not verified much, if at all. The user is authenticated but not strongly authenticated. He can therefore enter erroneous information, pass himself off for someone else or register more than once using different pseudonyms. As a general rule, this approach cannot make the user responsible for his actions, since the server is unable to prove anything.

Traceability problem: the server can track the activities of its clients and can therefore deduce a profile that often constitutes information of greater benefit than a client's real identity. Thus anonymity is not completely guaranteed.

Group signature techniques (see documents [1], [2], [3] and [4]), used in electronic bidding in particular (see document [5]), also offer an anonymous authentication mechanism. The general principle is for a client to register with a trusted authority, constituting the group manager. Clients registered with that authority belong to the same group and are provided with means for signing in the name of the group. Any server is provided with means for verifying a signature. Verifying a signature in fact consists in verifying that it was produced by a member of the group and reveals no information on the member who produced it and therefore does not enable the server to find out the identity of that user. Thus the anonymity of clients is guaranteed. A server can nevertheless interrogate the group manager to revoke the anonymity of a signatory.

Thus the above technique addresses the problem of anonymous authentication but does not incorporate any mechanism for maintaining an authentication session between a client and a server. Thus the server cannot "remember" the identity of the client. To maintain the authentication, the client must sign each of the messages that he sends to the server and therefore must have the necessary calculation means available at all times. Moreover, the calculations employed for applying such signatures are relatively voluminous and therefore rule out fast authentication.

SUMMARY OF THE INVENTION

An object of the invention is to provide a complete solution to the anonymous authentication and session maintaining problem.

The object cited above is achieved in the context of the present invention by a method that comprises the steps of:

i) identifying and registering a client and providing him with means for authenticating himself to an anonymous certification authority, ii) authenticating the client to the anonymous certification authority using the means provided in step i) and supplying means enabling him to authenticate himself anonymously to a server, iii) authenticating the client by producing an anonymous signature and opening and maintaining an anonymous authentication session with a server, and iv) selectively allowing contact between the server and the anonymous certification authority to revoke the anonymity of the client using the signature provided in step iii).

For a user client, step i) advantageously consists in recovering from the anonymous certification authority, constituting a trusted third party, information (a public key and a certificate) enabling it to calculate anonymous signatures. Any server or resource can verify these signatures without the real identity of the user being revealed to it. A valid signature guarantees to the resource or server that it can, if necessary, recover the real identity of the user by interrogating the trusted third party.

Thus the present invention proposes a complete and global solution that:

Guarantees the anonymity of clients: the invention is based on strong authentication mechanisms that preserve the anonymity of clients.

Maintains an authentication session effectively: the authentication session maintenance mechanism that the invention proposes does not necessitate any calculation on the client side. All the necessary information is calculated during the authentication stage.

Makes clients responsible for their actions: the invention guarantees non-repudiation because the server can revoke the anonymity of a client at any time by interrogating a trusted third party and because the server can prove each of the actions of a client.

The present invention also relates to a system adapted to open and maintain an authentication session guaranteeing non-repudiation, characterized in that it comprises means adapted to implement three stages:

a first stage in which the client calculates data formed of a series of tokens of which one enables a session to be opened and the others enable the session to be maintained, a second stage in which the client makes a strong undertaking to the server as to the series of tokens, and a third stage of maintaining the session with the aid of the series of tokens.

It will be noted that in the above session opening and maintaining system, the client is able to produce a digital signature that is not necessarily anonymous, although it is preferably anonymous, of course.

The documents [12], [13] and [14] describe various forms of electronic bidding. None of them teaches or suggests a session opening and maintaining system enabling multiple successive interventions of the client during one and the same session resulting from a single initial authentication. In fact, in the systems defined in each of the above documents, bidders send only one amount or item of data.

BRIEF DESCRIPTION OF THE DRAWINGS

Other features, objects and advantages of the present invention will become apparent on reading the following detailed description and examining the appended drawings, which are provided by way of non-limiting example and in which.

DETAILED DESCRIPTION OF THE PREFERRED EMBODIMENTS

Figure 1:
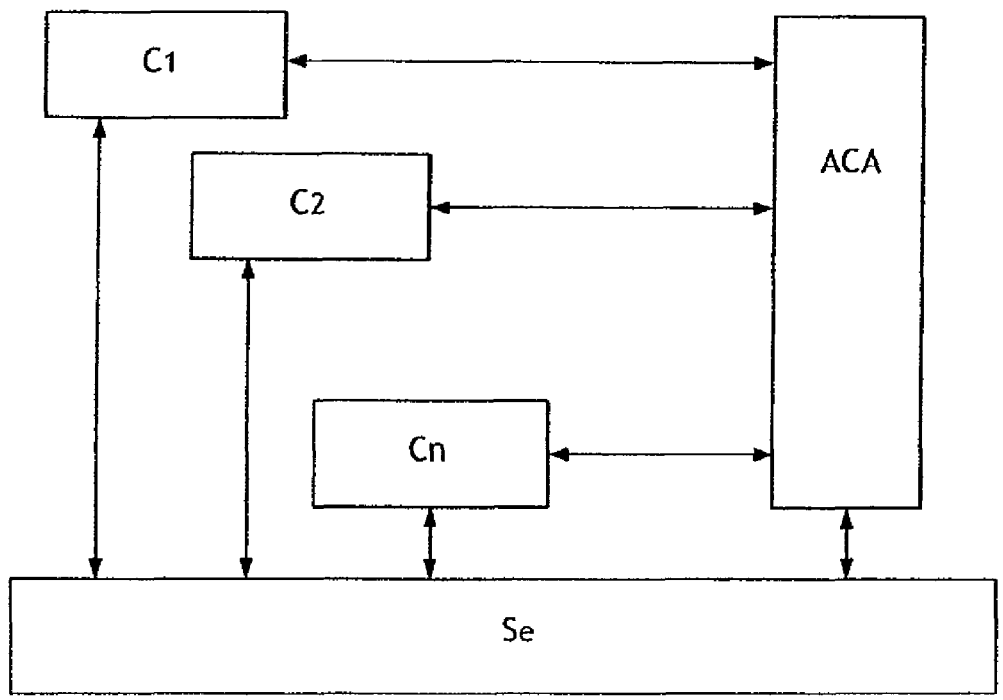
FIG. 1 shows the general architecture of relational means employed by the present invention.
Figure 2:
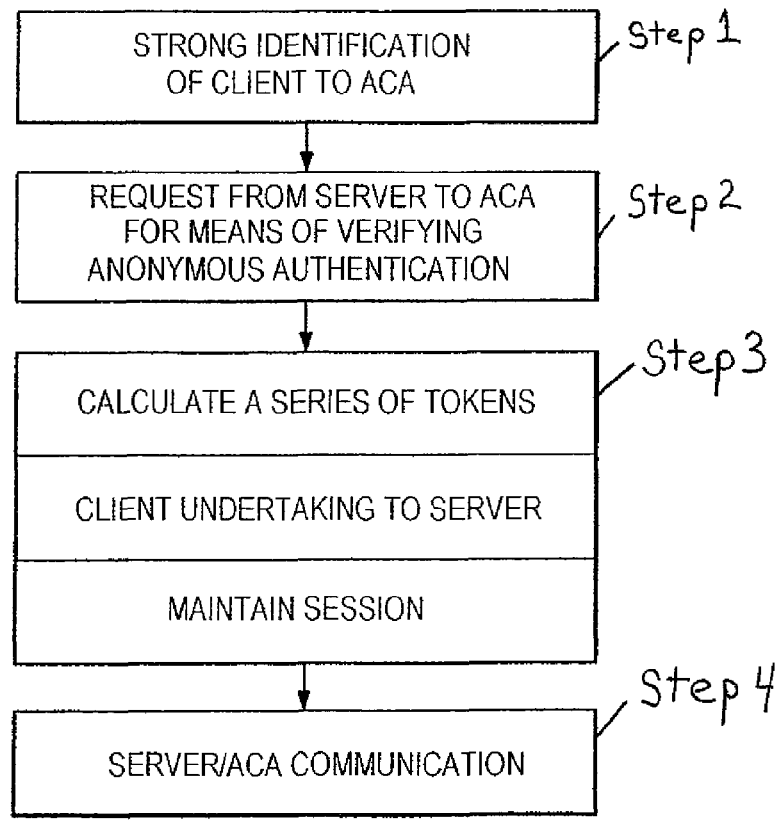
FIG. 2 is a flowchart of the method of the present invention.

As indicated above and as shown in the appended FIG. 1, the invention uses three protocol entities: clients C, at least one anonymous certification authority ACA and at least one server (i.e. "resource") Se.

As also indicated above, the invention proposes an anonymous authentication mechanism that is based on the use of anonymous certificates, an economical and effective session maintaining mechanism that guarantees non-repudiation, and a global solution combining the anonymous authentication mechanisms (e.g. group signature, anonymous certificate) and the session maintaining mechanism to solve the following problems:

User anonymity: the invention relies on strong authentication mechanisms that preserve the anonymity of users, not only from other users, but also from servers.

Effectiveness and portability: the authentication session maintaining mechanism that the invention proposes does not necessitate any calculation at the user end, as all the necessary information is calculated beforehand, during the authentication stage.

Non-repudiation: the invention guarantees non-repudiation because the server can revoke the anonymity of a user at any time by interrogating the trusted third party (ACA) and because the server can prove each of the actions of a user.

Ergonomics: the user registers only once with a trusted third party (ACA).

The anonymous certification authority (ACA) delivers anonymous certificates and is adapted and approved to revoke user anonymity if necessary. The server provides services to persons (clients) C wishing to remain anonymous, but whose anonymity can be revoked if necessary. A client obtains an anonymous certificate with the objective of authenticating himself anonymously and then maintaining a session with a server.

A preferred implementation of the method of the invention comprises essentially four steps.

Step 1: identification. The client C registers with a trusted authority (this authority may be either the anonymous certification authority itself or some other certification authority). For the user, this step consists in providing personal information (name, forename, address, etc.). Several options are available for this. For example, the client can register either on-line, by filling in an electronic form, or by physically going to a specific place. The trusted authority verifies the identity of the client and some or all of his personal information, stores that information for future use, and supplies to the client means to enable him to authenticate himself to the ACA (for example a login/password or a certificate). Note that throughout the remainder of the protocol the client does not at anytime have to supply his personal information.

Step 2: authentication to the ACA. This step involves the client and the ACA. The client authenticates himself to the ACA using the strong authentication means obtained in step 1. The ACA supplies in return means for producing an anonymous signature and holds the means for linking the client (i.e. the physical person known to it as a result of the strong authentication) at any time to any signature emanating from the client.

Step 3: anonymous authentication with the server. This step involves a server and a client. The client wishes to maintain a session for access to the services that the server offers and to this end must inform the server that he has authenticated himself to the ACA using the strong authentication process. The client wishes to remain anonymous vis-à-vis the server and other potential clients. The object of this step is to open a session with the server and to carry out a certain number of calculations so that the session may thereafter be maintained very quickly.

Thus this step is divided into three stages. The first stage enables the client to calculate data constituting a series of tokens, one of the tokens enabling him to open a session and the others enabling him to maintain the session. The second stage enables the client to give a strong undertaking to the server on the basis of the series of tokens. The third stage consists of maintaining the session using the tokens.

Note 1: In certain cases (for example if the anonymity service is billed to the server), the ACA may require authentication of servers seeking to offer the anonymity service to their users. To this end, the ACA may be able to demand authentication of the servers before supplying an anonymous certificate to the user and/or before revoking anonymity. Servers must therefore register themselves with the ACA beforehand. To this end, each server submits a request for affiliation to the ACA, which evaluates the proposal (according to criteria that it has established) and decides whether or not to accept the proposal.

Note 2: The first two stages necessitate a dialogue between the user and the ACA, in the first stage, and between the user and the server, in the second stage, and are therefore typically effected using a web browser or an application hosted on the station of the client. However, since the series of tokens is precalculated during the authentication stage, it can be onboard a portable terminal (mobile telephone, PDA, etc.). The user can therefore authenticate himself to the server using the browser or an application and then maintain the authentication session using another type of terminal.

All the tokens are for one-time use and are strongly interdependent. They can be calculated only by the client and cannot be falsified. Anyone, and therefore the server, can verify the dependency (and thus the source) of the tokens.

Thus, during a first time period, while opening a session, the client calculates a series of tokens. The token generation algorithm is based on the use of two cryptographic primitives: a hashing function and a random number.

A hashing function Ho has the following properties:

$H(M)$ operates on a message M of arbitrary length

The result $h=H(M)$ has a fixed length $l$

Given M, it is easy to calculate $h$

Given M, it is difficult to find another message $M_0$ such that $H(M)=H(M_0)$

Hashing functions include the MD5 (Message Digest 5) function and the SHA (Secure Hash Algorithm) function. The SHA function produces an output comprising 160 bits called an abbreviated message.

To initialize the series of tokens, it is necessary to generate a random number from which the hashing function calculates the tokens. The random number must be cryptographically secure, i.e. the probability of a successful exhaustive search for it must be practically zero.

The hashing function applied to the random number $W_0$ produces a result $W_1$ (i.e. a first token) to which the hashing function is applied again to obtain a second token $W_2$, and so on to obtain $\underline{n}$ tokens:

$$H(W_0)=W_1, \ldots, H(W_{n-1})=W_n$$

The series of tokens is therefore $(W_n, W_{n-1}, W_{n-2}, \ldots, W_1, W_0)$. Because of the properties of hashing functions, it is easy, starting from $W_0$, to calculate any $W_i$ (for $\underline{i}$ from 1 to $\underline{n}$), whereas it is impossible in practice to find $W_0$ from $W_i$ (for i from 1 to n).

In a second time period, the client uses the strong anonymous authentication means obtained in step 2 to produce an anonymous signature of the initialization token $W_n$, the signature enabling the server to authenticate the client (it can verify the validity of the signature and therefore be convinced of the rights of the client it is faced with). In this way the client opens up an anonymous session with the server and can maintain the session using the series of tokens. The token $W_n$ is stored by the server and is used to verify the validity of the other tokens (and thus of the session).

Note: During the anonymous authentication stage, certain information may be associated with the initialization token (for example, the face value of a token). This information constitutes session information and is used to describe the semantics associated with each token. A token therefore enables a server to find out the identity of the sender and also the session information.

During the session, the server wishes to be sure of being able to determine the physical identity of the client it is faced with in accordance with the principle defined in the fourth step. Moreover, that authentication must be carried out quickly. To this end, on each new authentication, the client simply sends a token from the list calculated previously: $W_{n-1}$, then $W_{n-2}$, $W_{n-3}$, etc. To continue the session, the client transmits the tokens in the order from n−1 to 0.

As a general rule, if the result of $h(W_{n-1})$ is equal to $W_n$ then the authentication is accepted. The server is capable of verifying the link: the token $W_i$ received is compared with the tokens of all the clients present in the database. Accordingly, to find in the database the $W_k$ linked to the $W_i$ received, the following formula is used: $h^l(W_i)=W_k$ (this relies on the fact that $h^2(W_{n-2})=h(h(W_{n-2}))=h(W_{n-1})=W_n$). If the server finds the token $W_k$ in its database, it agrees to continue the session and the token $W_i$ replaces the token $W_k$ for the next verification. If not, the token does not belong to a client and authentication is refused.

During the various authentications that are carried out during a session, the server therefore always knows how to link a token (and thus the session) to the anonymous signature effected at the time the session was opened.

Step 4: This uses a server and a trusted authority. The server holds a signature that it knows emanated from a client who has been strongly identified to the ACA. If it requires to, it can therefore send the signature to the ACA, which has the means to discover the physical identity of the signatory (cf. first step) and to supply that information to the server. The latter can therefore obtain the physical identity of the client who produced the signature and the series of tokens it received during the session.

In a variant in which the server does not know the identity of the client at any time, once the ACA has revoked anonymity, it contacts the client involved personally and terminates the session appropriately.

In some cases, the right to effect an anonymous signature is time-limited (for example linked to only one session). In this case, the client must strongly authenticate himself to the ACA for each session (i.e. for each series of tokens).

The number of sessions linked to an undertaking is time-limited because the series of tokens is finite. Once the last token has been sent, the client must obtain a new series of tokens with the aid of the server and must anonymously sign the initialization token.

The step 3 can be used on its own to open and maintain an authentication session effectively. Thus a client can strongly authenticate itself to the server (but without anonymity in this instance) and maintain a session, very quickly, using the series of tokens that it has calculated beforehand. This approach further guarantees non-repudiation.

Specification of the Token Mechanism

Initialization Token

The first token a client sends to a server is called the initialization token and opens a session. It is linked to the authentication of the client on the basis of a signature and to the session information. Thus the initialization token fixes, by association, in a message sent by the client to the server, the proof of authentication and the session initialization parameters.

In the case of a bidding application, as described hereinafter, the token mechanism is used during the stage of participating in an auction. A client requests to participate in the auction by sending a message made up of the initialization token associated with the parameters of the auction, for example the identifier of an article, the current bid, and the value of the bid increment. This message is signed. The client also sends, in this request to participate, means enabling the server to verify the signature (message, public key, certificate, etc.) and thus to authenticate the client, as a function of the signature mechanism used. Signature mechanism specifications are described hereinafter.

If the authentication of the client by the server is valid, the bid server stores the initialization token and the data sent by the client in the request to participate.

Session Maintaining Tokens

In the case of bidding, if the server authorizes the client to participate in the auction after receiving the initialization token, the client can then submit raised bids by sending the server the successive tokens, and nothing but the tokens, because each bidding instruction from the client is reflected in the sending of a token with no other information or signature. Using the information stored with the initialization token, the server can authenticate the instruction by assigning the token to its proprietor client and calculating its value. Accordingly, each token the server receives is compared with all the stored tokens. Because of the interdependency of the tokens, a new token received by the server can correspond to only one token in the database. The server retrieves the information on the client and on the article linked to a received token by matching it to a single stored token. By this method, the token mechanism can be applied to bidding by establishing calculation rules.

On the client side, the calculation of the index i of the token $W_i$ for a raised bid (upbid) is based on the current bid (maxbid) of the article and the bid increment (inc) for the article. The following formulae may be used:

upbid=maxbid+inc j=(upbid−startbid)/inc i=totalnumberoftokens−j

On the server side, the token $W_i$ received is compared with the tokens in the database. The following formulae may be used to retrieve the token and calculate its value:
the formula for finding $W_k$ in the database is:

$h^i(W_i)=W_k$ the formula for calculating the value of $W_i$ is:

$W_i$=bidof$W_k$+(l*inc)

Specification of Initialization Token Signature Mechanism

Signing the initialization token enables a session to opened and the signature can be anonymous or not, as appropriate. The client has a private (secret) key SK, a public key PK and a certificate (anonymous or not). He uses his private key SK and a cryptographic algorithm (for example an RSA, DSA or group signature algorithm) to sign a message made up of the initialization token $W_n$ and session information (session_data). In this way he obtains a signature S-Sigsk ($W_n$, session_data) and sends it to the server with the message, his public key PK and the certificate C that links that public key to his identity.

Figure 3:
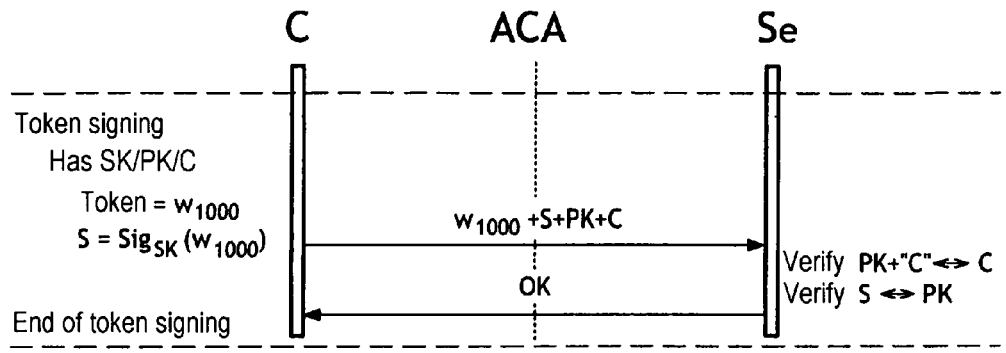
FIG. 3 is a diagram of a strong identification process.

FIG. 3 is a diagram of the initialization token signature protocol.

Anonymous Signature Mechanism Specification

Anonymous Certificate

During the second step, the client C creates a pair of keys (for example RSA keys) comprising a public key PK and a private (secret) key SK. He keeps the private key secret and sends the public key PK to the ACA in order to obtain, during a strongly authenticated session, a certificate AC=$Sig_{ACA}$ (PK, Pseudo) for that key linked to a pseudonym chosen by the ACA and/or the client. That pseudonym can be the result of encrypting the real identity of the client accompanied by a random number. It is therefore easy for the ACA to revoke the anonymity of the client by decrypting the pseudonym to obtain the identity of the client. The ACA stores the link between the client and his pseudonym so as to be able to revoke anonymity subsequently.

Note: An anonymous certificate can generally be used to link a pseudonym to a public key. However, depending on the context, it may also include other information limiting the scope of the certificate (e.g. the identifier of the server, the identifier of a session, a validity date, the IP address of the client, the authentication context, etc.).

For the client, the step of signing the initialization token involves using his private key PK (the signature is therefore an RSA signature). The message consists of the initialization token W1000, the signature S, the public key PK and the certificate linked to the pseudonym AC+Pseudo. The server therefore opens a session with a client that it knows only by a pseudonym and verifies that the client has strongly authenticated himself to the ACA by means of the certificate AC and that the certified public key PK belonging to the pseudonym can be used to verify the signature of the initialization token.

Anonymity is revoked if the server supplies the certificate (or the pseudonym) to the ACA, which can identify the client to whom the pseudonym corresponds and therefore the client who effected the signature.

Figure 4:
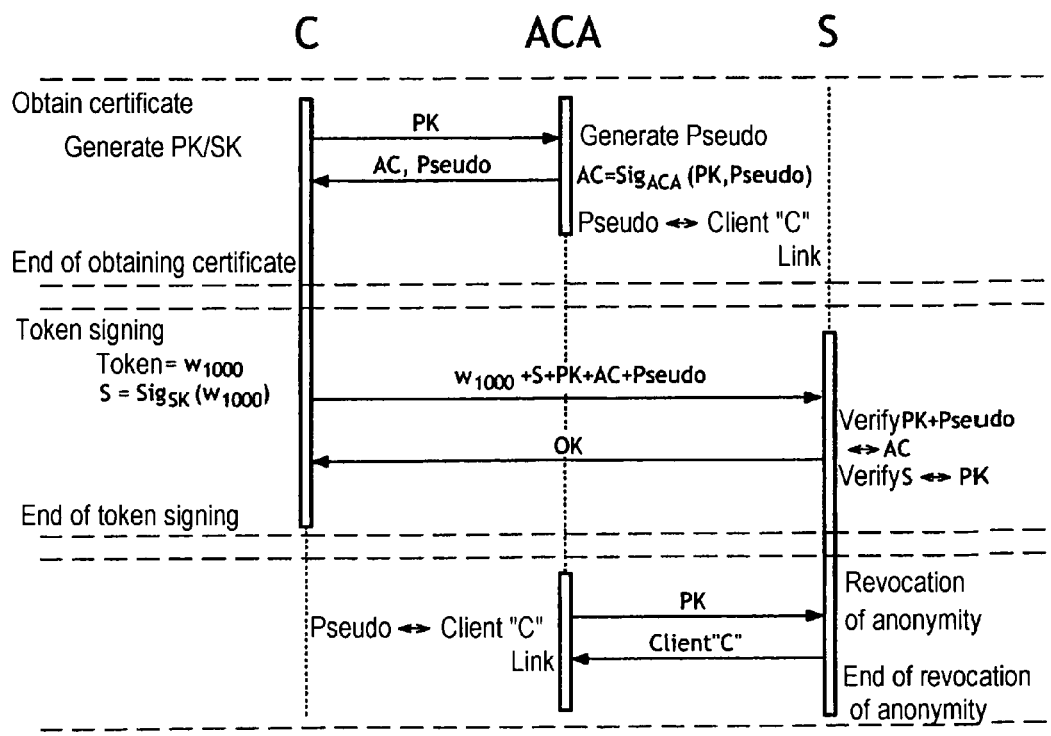
FIG. 4 is a diagram of an anonymous certification process.

FIG. 4 shows the details of the anonymous certificate protocols.

Note that to obtain beneficial anonymity it is necessary to change the certificate (and therefore the signature key pair) for each session. It is therefore necessary for the client to connect to the ACA for each session.

Note: If the client wishes to connect to a plurality of servers benefiting from the services of the ACA, he has two options: either the ACA supplies a single (universal) certificate for all servers, in which case it is possible to trace the pseudonym of the client over all sites (it is not known who he is but it is known what he has done on each of the servers), or the ACA supplies a certificate for each server, in which case the universal nature of the certificate is lost but it is then impossible to trace the same client over more than one server.

Each server supplies the client with an identifier that is forwarded to the ACA. The latter therefore knows that it has supply a certificate for a particular server to a particular client and will therefore not supply two certificates.

Note: Similarly, if the client has two machines from which he wishes to access the server (for example one machine at work and another machine at home), he must be able to obtain two different certificates from the ACA.

Revocable Anonymity Blind Certificate

A portion of the method of the present invention may be similar to a revocable anonymity blind certificate.

The concept of a blind signature scheme was introduced by Chaum at Crypto '83. A blind signature scheme is a protocol involving two entities, a signatory and a user. It enables the user to obtain a signature of a signatory on a given message without the signatory finding out anything at all about the message.

The revocable anonymity blind signature model is made up of a plurality of users, a signatory, a recognized authority, for example a judge, and two protocols:

A signature protocol used between the signatory and the user.

A recovery protocol used between the signatory and the judge.

Using the signature protocol, the sender obtains a valid signature on the message of his choice in such a way that the signatory cannot link the protocol and the message/signature combination. There are two types of revocable anonymity blind signature, depending on the information that the judge receives from the signatory under the second protocol:

Type 1 revocation: using the portion of the protocol coming from the signatory, the judge provides information that enables the signatory (or anyone else) to recognize the message (i.e. the judge can retrieve the message).

Type 2 revocation: using the message and the signature, the judge enables the signatory effectively to retrieve the user or the portion of the protocol corresponding to the signature.

For revocable anonymity blind signature (also known as "fair blind signature") scheme examples, see the documents [6], [7], [8], [9], [10] and [11].

Figure 5:
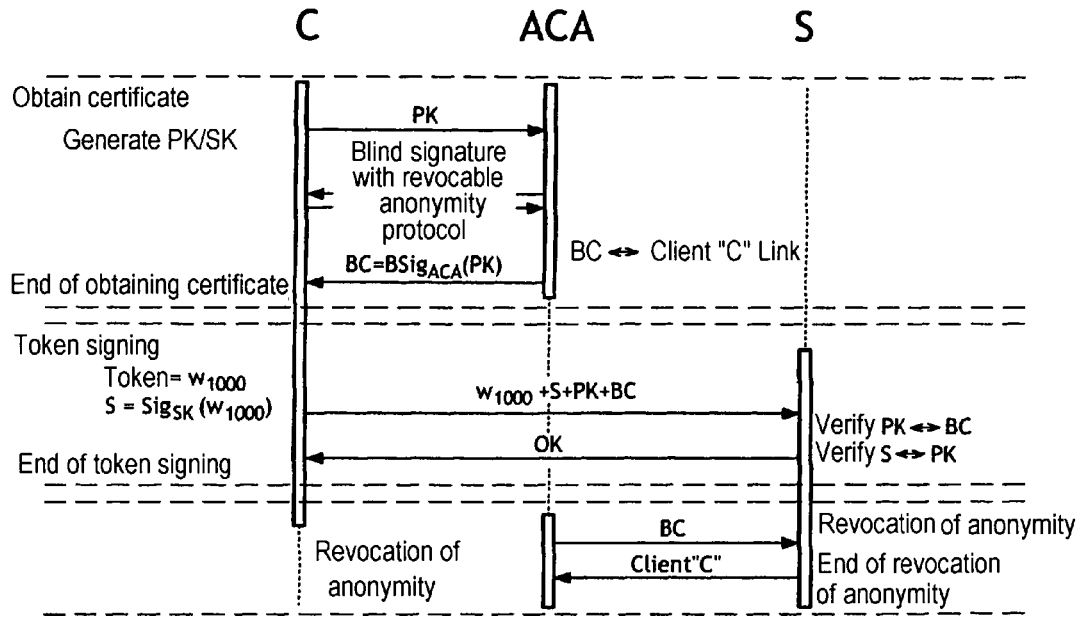
FIG. 5 is a diagram of a revocable anonymity blind signature process.

In the case of the invention (type 2 revocation), the ACA is the signatory and the server is the judge. The client is the user. In the first step, the client creates a pair of keys (for example RSA keys) comprising a public key PK and a private (secret) key SK, keeps the private signature key secret and sends the public key PK to the ACA in order to obtain, during a strongly authenticated session, a revocable anonymity blind signature BC of that key (under the protocol for obtaining a certificate). The blind signature corresponds to his anonymous certificate. The ACA stores the means for revoking the anonymity of the signature. In FIG. 5, the blind signature is denoted BC=$BSig_{ACA}$ (PK).

For the client, the initialization token signature step (under the token signature protocol) consists in using its private key PK to sign, and the signature is therefore an RSA signature. The message consists of the initialization token W1000, the signature S, the public key PK and the anonymous certificate BC. Thus the server verifies that the client has been strongly authenticated to the ACA using the anonymous certificate (it verifies that the signature BC does come from the ACA), and that the certified public key PK can be used to verify the signature S of the initialization token.

Anonymity is revoked if the server supplies the anonymous certificate BC to the ACA, which can tell the time at which it produced the signature (under the anonymity revocation protocol) and thus to whom it supplied it.

FIG. 5 is a diagram of the details of the revocable anonymity blind certificate protocols.

Note that in this case it is necessary to obtain a blind signature for each session, and that it is therefore impossible to link two sessions of the same client. The client must therefore connect to the ACA before each session starts.

In the situation of a plurality of servers or a plurality of machines by client, the same problem and the same solutions are encountered as with an anonymous certificate.

Group certificate

The invention may also make use of a group signature.

A group signature enables the members of a group to produce a signature that the verifier recognizes as having been produced by a member of the group, although without being able to tell which member. However, a trusted authority can revoke this anonymity at any time and therefore reveal the identity of the signatory. Such signatures often cannot be correlated: it is impossible to determine if two signatures were effected by the same person.

In any group signature scheme, the group is assigned a single group public key and each member of the group is assigned an identifier and a private key specific to him. Using his private key, a group member can apply to a message of his choice a group signature which can be verified by any entity using the group public key. Verification tells the entity only that the signature was applied by a group member, but gives no information as to the identity of the member who signed. On the other hand, the trusted authority has supplementary information enabling it to retrieve the identity of the member concerned, and therefore to revoke his anonymity at any time (this process is referred to as the trusted authority "opening" the signature). For group signature schemes see the documents [1], [2], [3] and [4].

In the situation of the invention, the ACA is the trusted authority. In the first step, a client registers in a group with the ACA by interacting with it to obtain a member certificate GC under the member registration protocol. The ACA retains the means to open a signature if necessary.

The step of signing the initialization token W1000 consists in producing a group signature $S=Sig_{GP}$ (W1000) of that element (under the group signature protocol). Thus, the signatory is anonymous within the group. The server has the means to verify that a signature was applied by a member of the group (under the group signature verification protocol) but without being able to tell which member that was.

Finally, as the trusted authority, the ACA has the means to open the signature (under the group signature opening protocol) to revoke the anonymity of the signatory and divulge his identity.

Figure 6:
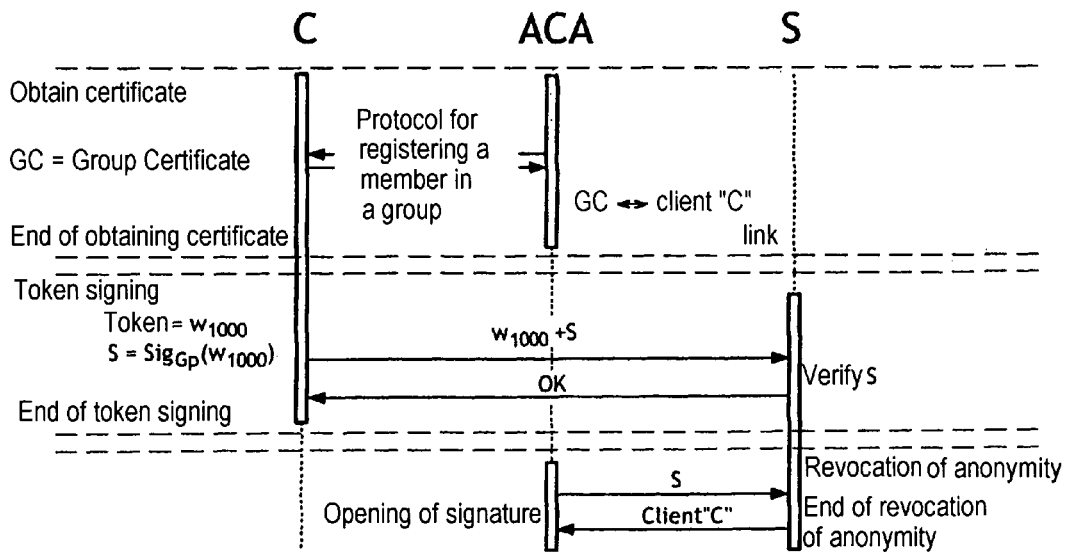
FIG. 6 is a diagram of a group signature process.

FIG. 6 is a diagram of the details of the group certificate protocols.

Note that, because group signatures are anonymous and cannot be linked, it is not necessary to register with the group for each session. Registering with the group entitles the client to apply as many group signatures as he wishes without anyone being able to link two of his signatures. The single certificate may be used with a plurality of servers with no risk of it being possible to trace the client. Similarly, a client having several machines does not need to obtain several certificates.

Note: An interesting property of approaches that are based on group signatures and on blind signatures is that they enable the certificate generation functions and the anonymity revocation powers to be divided between two or more authorities. According to this principle, it is not possible to revoke the anonymity of a user unless this is authorized by all the authorities. This process is less natural in the case of anonymous certification.

Implementation Example

Application of the present invention to electronic bidding will now be more particularly described.

The application described here to illustrate the method of the invention is from the field of e-commerce in the form of auction sales via the Internet.

The selling principle adopted is that of conventional auctions, whereby a plurality of bidders submit increasing bids for an article during a specific time period. This implementation is based on client-server architecture Java technologies (applet, servlet, jsp) and a relational database management system.

1 Problem Specific to Bidding Solved by the Method 1.1 Object

The method offers an innovative solution to making electronic bidding secure and means that transactions may be carried out in total confidence.

At present, high-value on-line bids do not offer sufficient security to participants keen to preserve their anonymity. The organization of public auctions involving bids of several thousand or even several million Euros calls for new mechanisms.

The cryptography used in the context of the invention meets the applicable objectives. To preserve confidentiality, information transmitted is unintelligible to persons external to the transaction.

The method provides non-repudiation to guarantee that the client is not able to deny having made an increased bid, ensures the integrity of the data exchanged, and enables a user to be identified by authentication.

Moreover, the method is fast, in order to act on bid instructions in real time.

1.2 Innovation and Technical Advantages of the Method Applied to Bidding

The mechanism of signed tokens with anonymity is suited to bidding. With this method, a purchaser can be authorized to participate in bidding without risk of fraud linked to disclosure of his identity. No person is able to pass himself off for someone else and only registered and authorized members can participate in bidding.

The login/password system known at present is very widely used but does not offer complete guarantees. A computer can easily capture information transmitted in clear over the Internet and this enables hackers to steal passwords. Although a protocol such as the SSL protocol guards against this type of attack, it is not able to combat attacks based on dictionaries of passwords, which make it easy to break passwords that are too short and too simple.

The characteristic feature of the tokens used in the method of the invention is their one-time use. A token can be used for only one bid instruction and does not reveal any information on its user. It merely verifies that the request transmitted belongs to a specific user. Here, a bid instruction identified by a one-time password is certified to belong to a particular purchaser for a single amount.

The client C sends tokens to the bid server Se to bid for a product. A first token, denoted W1000 for client 1 and X1000 for client 2, presented at the start of bidding serves as an initialization token and provides a means of proof that remains valid for the remainder of the auction (see FIG. 7). Based on this token mechanism, the basic principle is to sign the first token sent to register the request from a client to participate. The method described above verifies the bidding tokens transmitted against the initialization token.

Subsequent tokens represent higher bids. For example, if a client (client 1) participates in bidding with a starting bid of 1000 units and an increment of 100 units, he can increase the bid to 1100 units by transmitting a token (W999). To raise his bid to 1400 units to beat another purchaser who has bid 1300 units, he has to reveal the token corresponding to 1400 units, i.e. the token W996.

Figure 7:
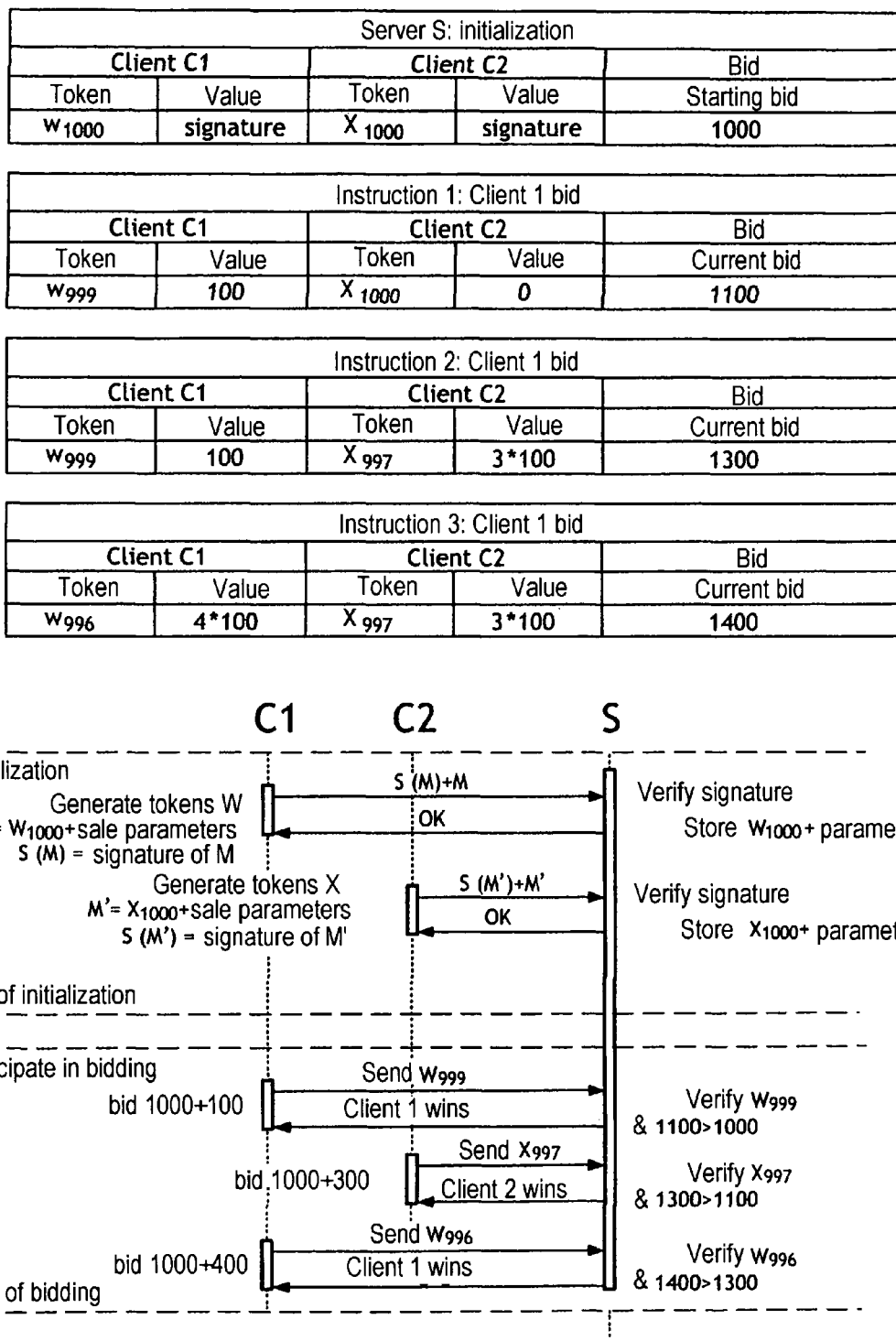
FIG. 7 is a diagram of application of the present invention to an electronic bidding process.

FIG. 7 is a diagram of this process.

2 Modeling the System 2.1 General Scheme

The auction application uses three entities defined above:
an anonymous certification authority (ACA) on an anonymity server (SA);
a service provider server Se, here a bid server;
a client C.

In the present application there is also a certificate server (SC) which supplies a strong authentication certificate.

The main functions of the electronic bidding system are:

Preparatory stage: this consists in offering for sale, viewing and obtaining an anonymous certificate;

Bidding stage: this consists in requesting and verifying participation in a sale, bidding, and verifying bidding with a view to acquiring an article;

Conclusion stage: this consists in terminating the bids, validating a winning bidder and identifying the winning bidder by revoking his anonymity, and closing the sale.

Each of the above functions is described in detail hereinafter.

2.2 Offering for Sale and Viewing

Figure 8:
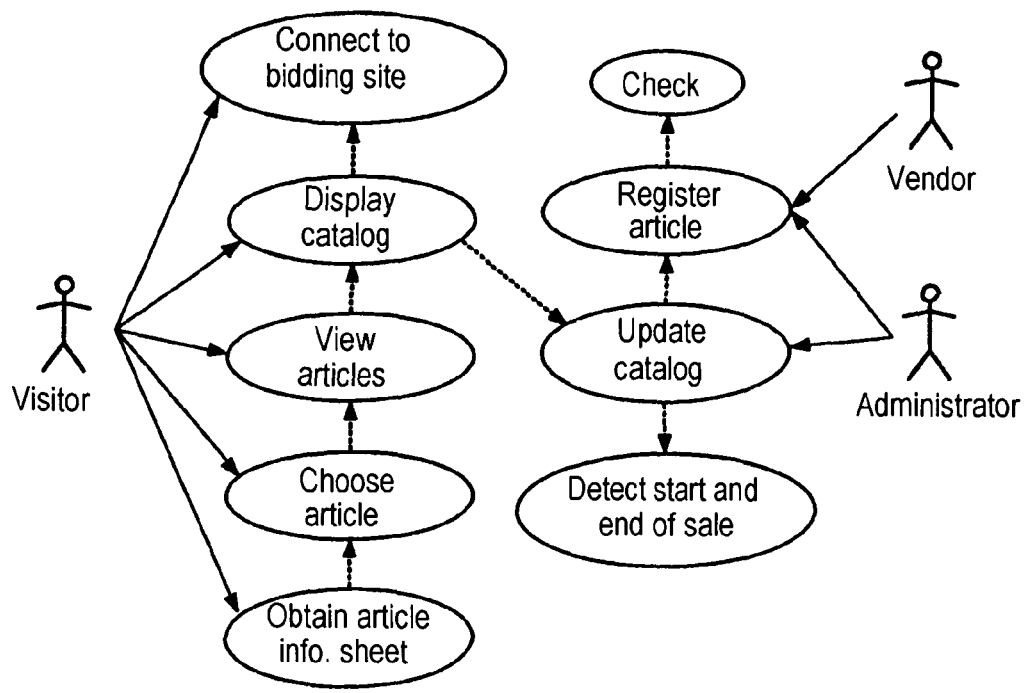
FIG. 8 is a diagram of a preparatory step of offering for sale and consultation in the context of electronic bidding.

FIG. 8 is a diagram of this function.

Figure 9:
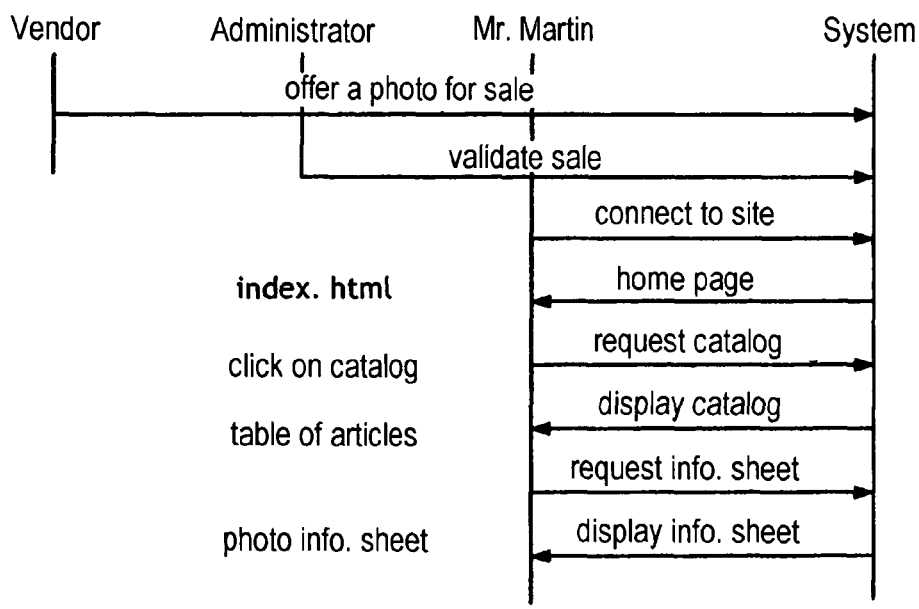
FIG. 9 is a diagram of one example of an article information sheet made available to a visitor, i.e. a potential client, in the context of an auction.

Execution stage: preparatory;

Security level: assure authenticity of bid server;

Precondition: known bidding sites;

Objectives: find out articles offered for sale;

Main actors: visitor, vendor, administrator;

Typical scenario: Mr. Martin is an art collector who decides to acquire a work offered for sale on a bidding site. He logs onto the site and requests to view the catalogue of articles offered for sale. Of those articles, he is more particularly interested in a photograph entitled "Regards" being sold by Mr. Vendor and whose starting price is 600 Euros. He then clicks to obtain the article information sheet, as shown by way of example in FIG. 9.

2.3 Obtaining Anonymous Certificate

Figure 10:
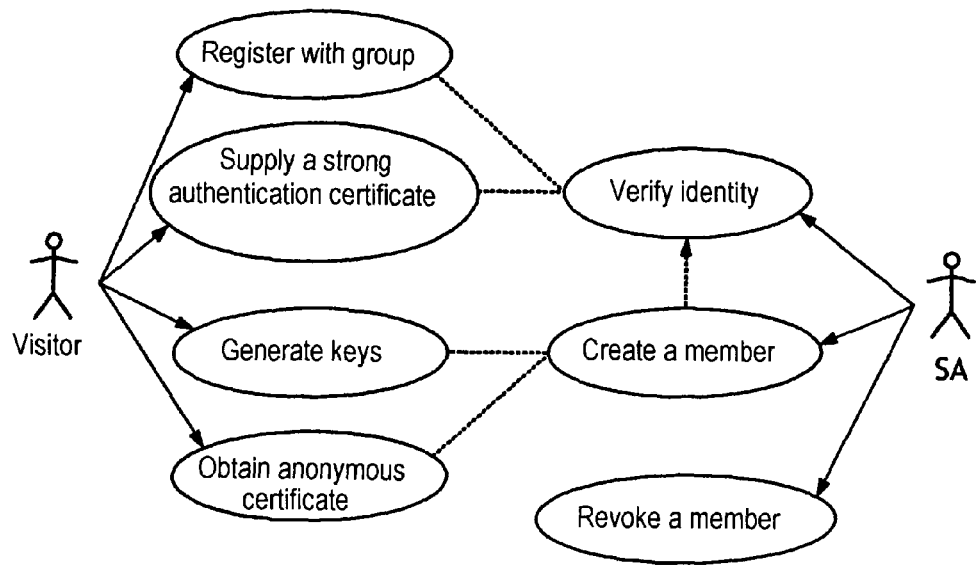
FIG. 10 is a diagram of a step of obtaining an anonymous certificate.

FIG. 10 is a diagram of this function.

Figure 11:
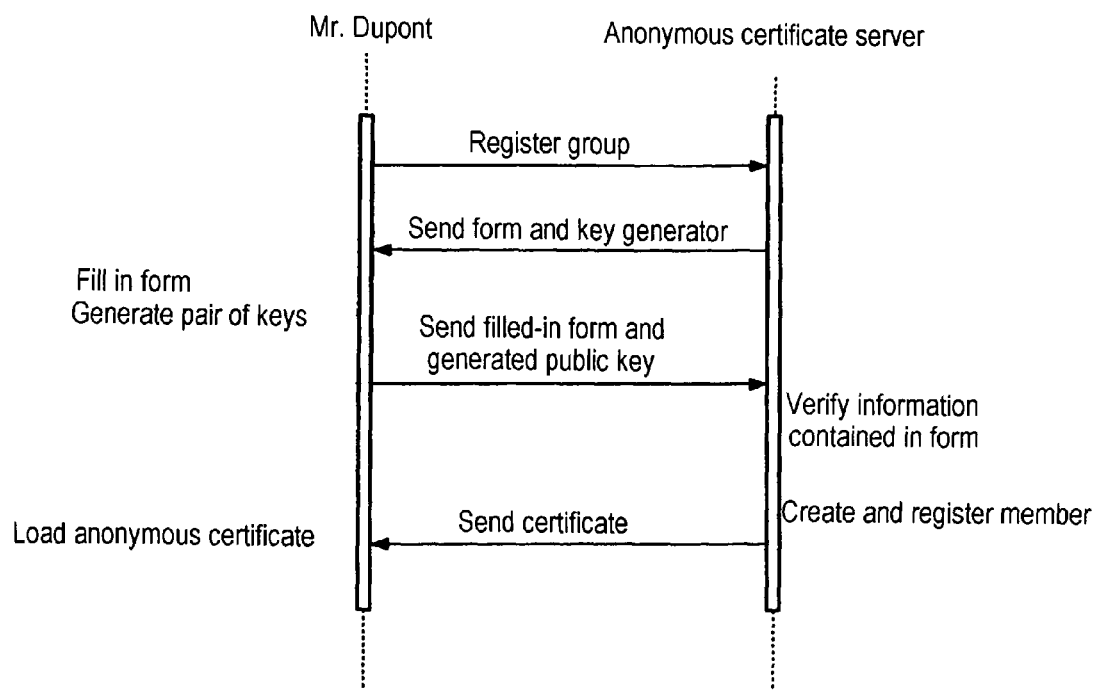
FIG. 11 is a diagram of group registration, key generation and certificate sending steps in the above context.

Execution stage: preparatory (this represents the first step of the method);

Security level: obtain anonymity with group signature;

Constraint: double certification;

Precondition: strong authentication (step 1 of the method), select anonymity server (SA);

Objectives: authentication in order to participate in an auction anonymously;

Main actors: visitor and SA;

Typical scenario: Mr. Dupond has decided to participate in the auction sale of a work of art whose starting price is 500,000 Euros. He wishes to remain anonymous in order not to reveal his financial resources or his interest in the type of work on sale, and he does not want anyone to find out that he is the new owner if he submits the winning bid. Remaining anonymous despite signing is made possible by the group signature feature. Mr. Dupond therefore uses a certification authority delivering a group signature. He registers with a group that verifies his identity before supplying him with the means for creating keys and registering him as a member. FIG. 11 is a diagram of this process.

2.4 Request to Participate with Certificate and Authorization

Figure 12:
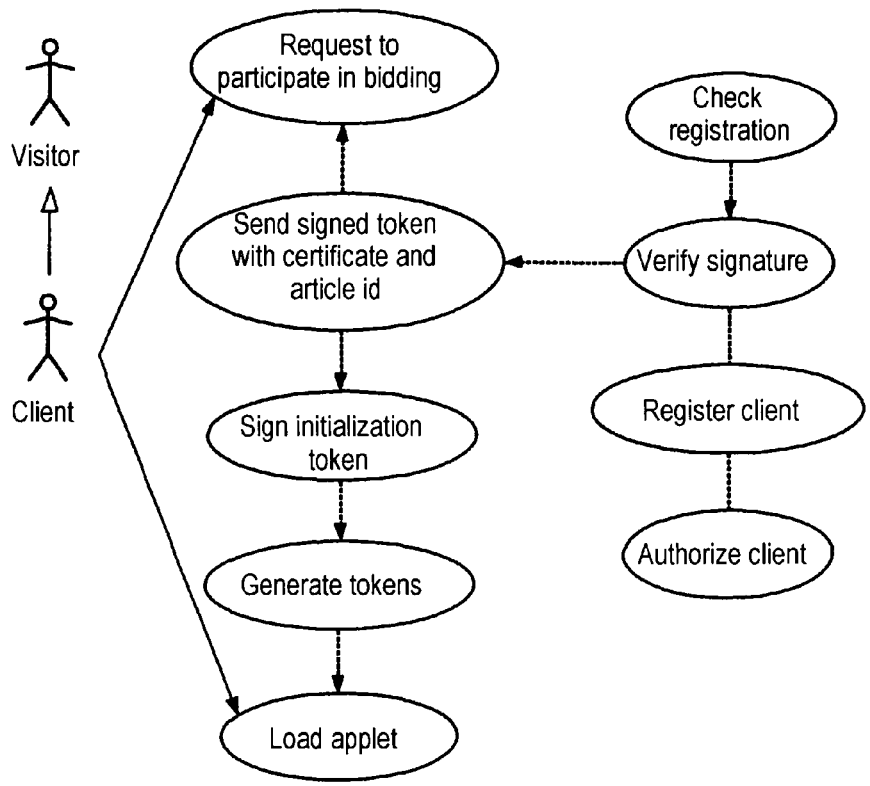
FIG. 12 is a diagram of a participation request step with certification and authorization.

FIG. 12 is a diagram of this function.

Figure 13:
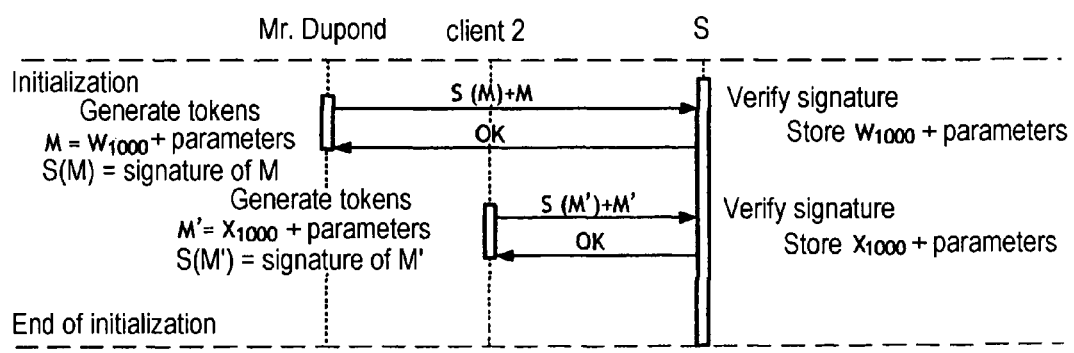
FIG. 13 is a diagram of the steps of initialization and then generation of tokens by two clients in the context of bidding.

Execution stage: bidding (this is part of the third step of the method);

Security level: certificate and signed applet for generating bid tokens;

Precondition: for client, to have a certificate, to have selected an article, to have authorized loading of signed applets; for bid server, to have obtained means for verifying an anonymous authentication (second step of the method);

Objectives: participating in an auction;

Main actor: client;

Typical scenario: to participate in bidding, Mr. Dupond submits his request by means of a signed token. This first token (W1000 for Mr. Dupond or X1000 for another client (see FIG. 13)), serves as an initialization token and provides a means of proof that remains valid for the remainder of the sale. This first token is generated and signed by the client with his private key using an applet transmitted by the bidding site. The token is associated with the parameters of the sale, the identifier of the article, the current bid and the value of the bid increment. The signature for Mr. Dupond is anonymous because of the group signature feature.

2.5 Participation in an Auction

Figure 14:
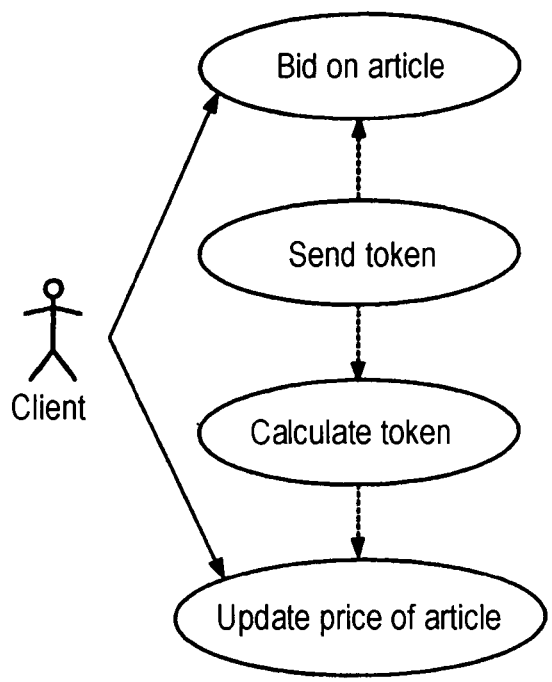
FIG. 14 is a diagram of a step of participation in an auction.

FIG. 14 is a diagram of this function.

Execution stage: bidding (this is part of the third step of the method);

Security level: token guaranteeing authenticity, integrity and confidentiality of bid instruction;

Precondition: to be registered for auction, token to have an affiliation;

Objectives: to submit a bid instruction to secure the sale;

Main actor: client;

Typical scenario: Mr. Martin participates in the auction sale of the photograph that he has selected with a starting bid of 600 Euros and a bid increment of 10 Euros. He is the first bidder and bids 610 Euros by transmitting a token (W999). While he is bidding, another client increases the bid to 620 Euros. Mr. Martin is ready to bid higher and clicks the button to increase the bid to 630 Euros and sends the token with index 997 (W997). As described above, each token corresponds to a value calculated as a function of the starting bid and the bid increment.

In this sale, the index 999 represents the value 610 Euros, the index 998 represents the value 620 Euros, the index 997 represents the value 630 Euros, the index 996 represents the value 640 Euros, etc.

Figure 15:
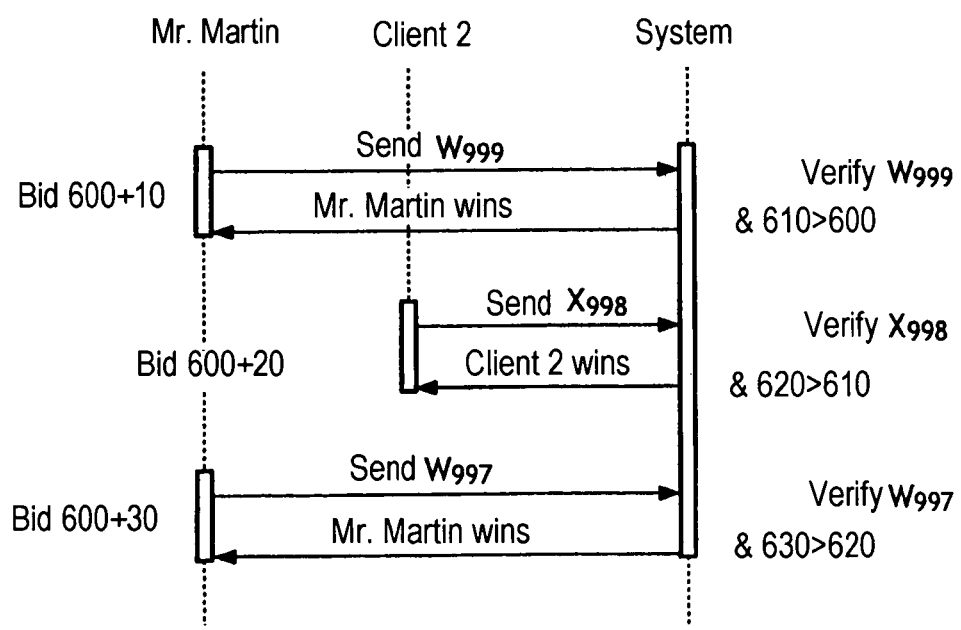
FIG. 15 is a diagram of the steps of raising a bid by sending a token whose index (i.e. "rank") represents the value chosen for the increased bid.

FIG. 15 is a diagram of this process.

2.6 Processing of Bid Instructions

Figure 16:
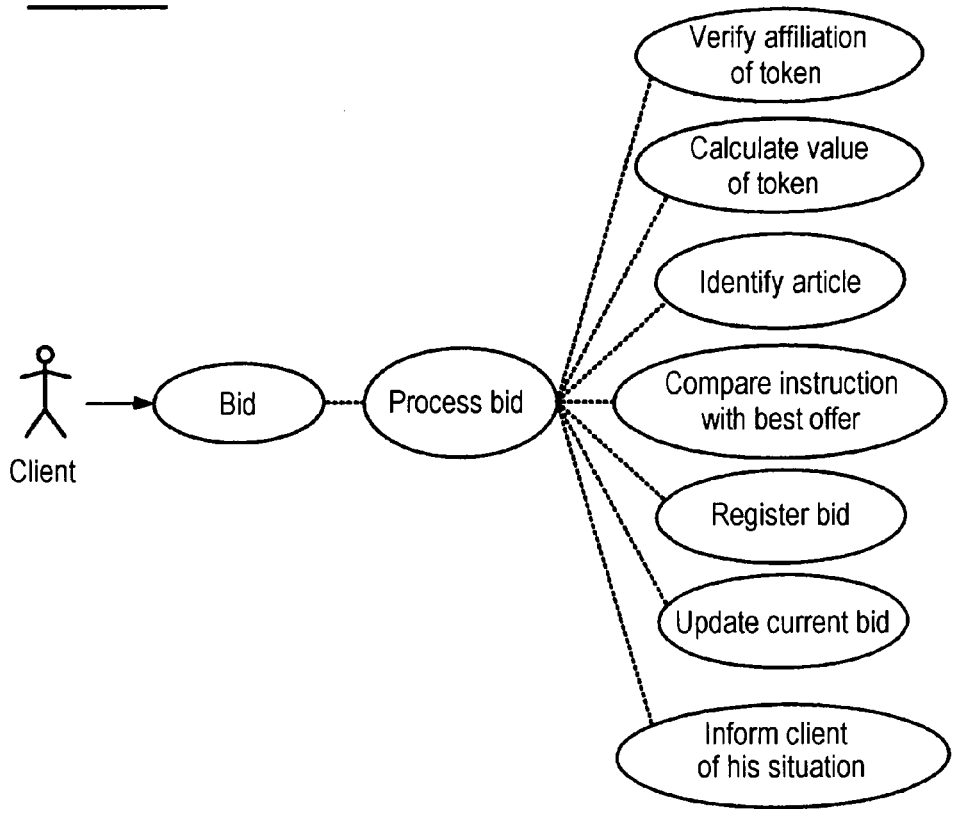
FIG. 16 is a diagram of a bid instruction processing step.

FIG. 16 is a diagram of this function.

Execution stage: bidding (this corresponds to the third step of the method);

Security level: token assuring authenticity of client and integrity of data;

Precondition: to have an initialization token for bids for an article by a particular client;

Objectives: to compare bid instructions, store instructions and inform of changing bids;

Main actor: client;

Typical scenario: When Mr. Martin clicks on the button to increase the bid, a token corresponding to that bid is sent to the bid server. At the server, the token enables retrieval of the information needed for the bid instruction, i.e. its value, its proprietor (Mr. Martin) and the article concerned. To find out the position of Mr. Martin, his instruction is compared to the instructions of other clients. Mr. Martin's bid is registered and the price of the photo is updated.

Figure 17:
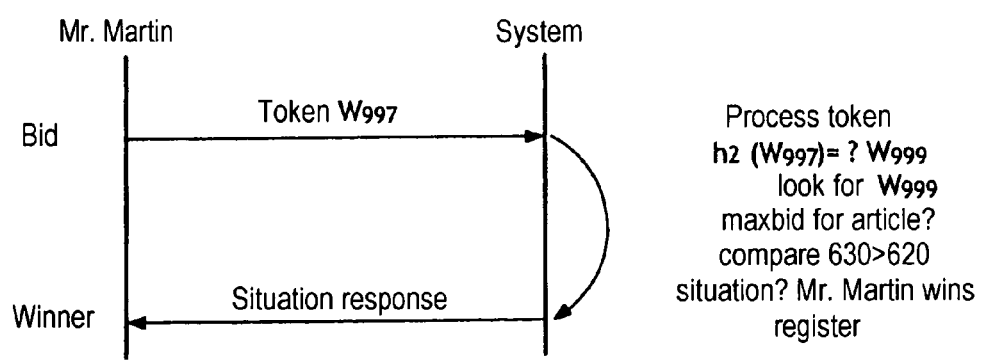
FIG. 17 is a diagram of processing a token received from a client and comparing the value represented by its index with data received beforehand.

FIG. 17 is a diagram of this process.

2.7 Conclusion of the Sale

Figure 18:
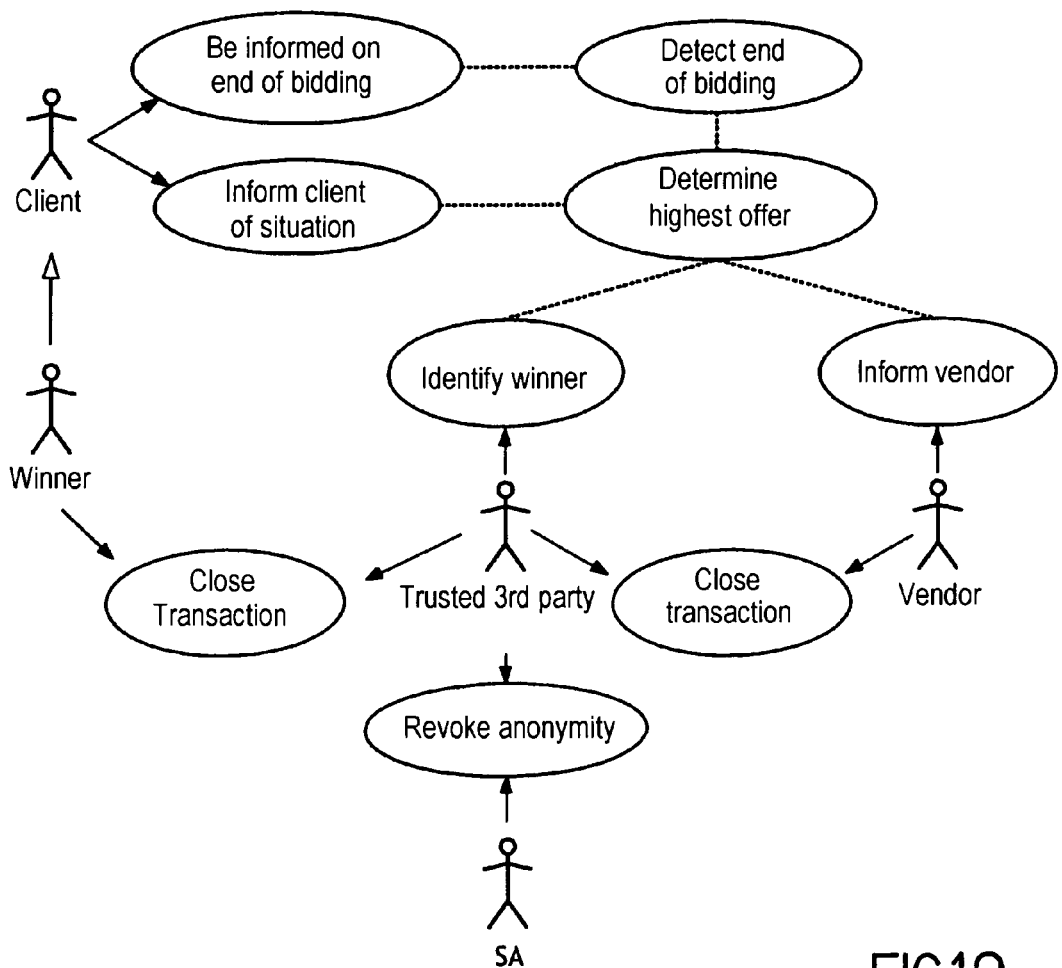
FIG. 18 is a diagram of an auction conclusion step.

FIG. 18 is a diagram of this function.

Execution stage: conclusion of the sale (this includes the fourth step of the method);

Security level: identifying winning bidder and revoking anonymity of winning bidder in event of a group signature;

Objectives: to determine winning bidder and to close transaction;

Main actors: client, vendor, SA, trusted third party;

Typical scenario: When the sale has finished, the system determines if Mr. Dupond is the winning bidder or not by comparing the various bids. The bid of 800 000 Euros is the highest bid and Mr. Dupond (anonymously) secures the work of art. The other clients are informed they have lost. The vendor is informed that his article has found a purchaser. The trusted third party is then responsible for revoking the anonymity of Mr. Dupond and for closing the transaction in the role of intermediary between Mr. Dupond and the vendor.

Figure 19:
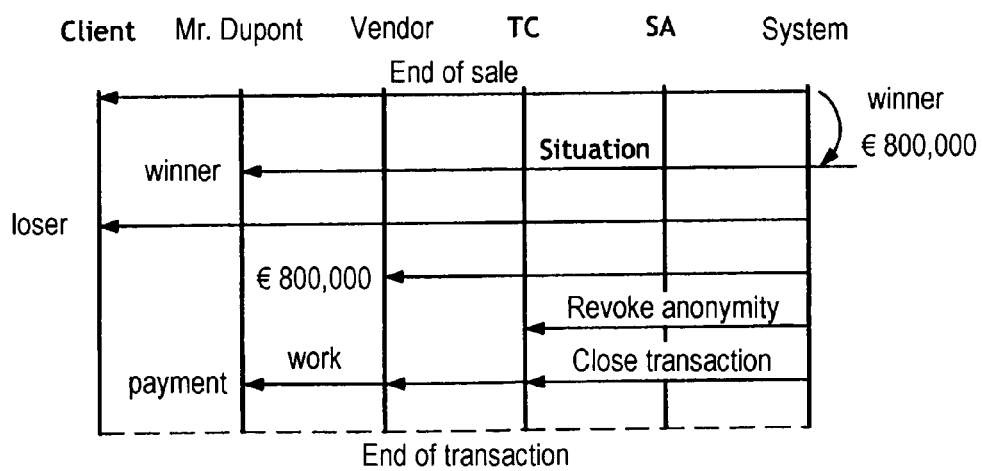
FIG. 19 is a diagram of steps of informing the winning bid client, losing bid clients and vendor and ending the transaction.

FIG. 19 is a diagram of this process.

2.8 Remarks

Registering to participate in bidding: registration for bidding is linked to a session. It is therefore necessary to reinitialize the registration in the event of disconnection or a change of session.

Use of certificates: strong authentication certificates and anonymous certificates are multi-use certificates. It is therefore possible to use a certificate for a plurality of auctions without having to submit a new request for each auction, unless the certificate is revoked or expires.

Properties at the request of the anonymous certificate: during the connection between a client and the anonymity server site, the confidentiality and integrity of the information transmitted and the guaranteed anonymity of the client vis-à-vis the outside world are assured by a communication protocol, for example the SSL protocol.

Anticipation of first participation: the configuration of the technical environment of the client station (signed cryptographic applet) and the approaches for obtaining certificates call for preparation to participate in a sale.

3 Specification of the Bidding Application

This section describes briefly the API for the services of the application at the following levels:

Request for an anonymous certificate and to participate in bidding;

Checking request to participate;

Bidding;

Verification of bid;

Conclusion of sale.

Steps marked * are considered as basic in the context of the method of the invention.

3.1 Request for an Anonymous Certificate and to Participate in Bidding

Strong authentication with ACA*

Generate keys*

Send public key to ACA*

Obtain anonymous certificate from ACA*

Generate tokens*

Store tokens*

Sign initialization token and article id*

Transmit signed token, certificate and signed article id*

Receive confirmation

Display confirmation 3.2 Check Request to Participate

Recover means for verifying an anonymous authentication with ACA*

Receive applet data

Verify signature using resources of ACA*

Connect to database

Register token, certificate, article id data

Select max price of article in base

Send confirmation 3.3 Bidding

Update maxbid

Calculate token relative to higher price $W_i$?

Upbid=maxbid+inc j=(upbid−startbid)/inc i=total number of tokens−j

Send token*

Receive response 3.4 Bid Verification

Count down sale time

Receive token $(W_i)$*

Verify token (find $W_k$ in base so $h^l(W_i)=W_k$)*

Select data from base for Wk

Select maxbid of article id

Calculate bid corresponding to received token $W_{i\ bid\ of}$ $w_i$=bid of $W_k$+(l*inc)

Compare maxbid to bid of $W_i$

Register bid of $W_i$(UPDATE)

Report to client on his situation 3.5 Conclusion of Sale

Detect end of bidding

Determine highest bid

Revoke anonymity*

Inform winning purchaser

Inform vendor

4 Technical Organization 4.1 Client—Server Architecture

Figure 20:
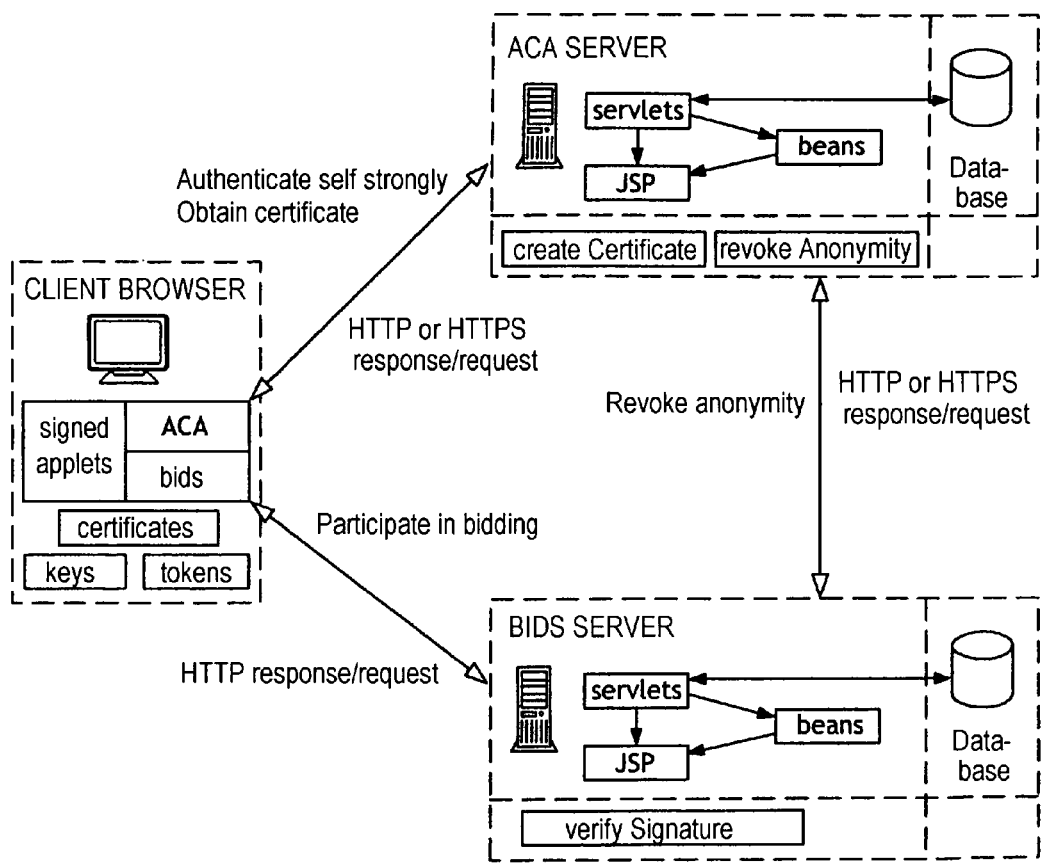
FIG. 20 is a diagram of a client-server architecture for implementing the method of the present invention.

FIG. 20 is a diagram of this architecture.

It includes a client browser, an ACA server and a bid server Se (the latter each being associated with a specific database) adapted to implement the steps cited above.

4.2 Prototyping Tools: Database, Application Server and Java Plug-In

The database used by the inventors to prototype this application is an Oracle 8i database. Oracle is a relational database management system (DBMS) from the company of the same name. Oracle uses the Structured Query Language (SQL) to define and manipulate data, and this language has become the norm in the field of relational databases. SQL*PLUS is the Oracle user interface enabling interactive use of SQL on an instantiation of Oracle.

The implementation of the invention uses the Java programming language and Java technologies. The application is managed by the IBM product WebSphere 3.5. The WebSphere Application Server is used for web transactions and interaction. It provides a portable platform for deployment of Java Web applications structured around the processing and execution of servlets, JavaBeans and Java Server Pages (JSP) files. It is an interface with the web server for managing client requests relating to server side resources and for routing them to the application server for processing. The tool used in WebSphere is the servlet engine. It executes inside the application server and manages requests relating to servlets, Java Server Pages (JSP) files and web applications that contain them.

The client station has been tested on a Windows system with the Java Plug-in. That Plug-in (supplied by Sun) updates the version of the JVM of the browser (Internet Explorer or Netscape). The Java Plug-in replaces the default Java Runtime of the browser with the Sun JRE.

Of course, the present invention is not limited to the particular implementation that has just been described and encompasses any variant conforming to the spirit of the invention.

REFERENCES

[1] G. Ateniese, J. Camenisch, M. Joye, G. Tsudik. A practical and provably secure coalition-resistant group signature scheme. In L. Bellare, editor, Advances in Cryptology—Crypto 2000, volume 1880 of LNCS, pages 255-270. Springer-Verlag, 2000.

[2] S. Canard, M. Girault. Implementing group signature schemes with smart cards. CARDIS Conference 2002.

[3] J. Camenisch, M. Michels. A group signature scheme based on an RSA-variant. Proceedings of Eurocrypt'98, volume 1514 of LNCS. Springer-Verlag, 1998.

[4] J. Camenisch, M. Stadler. Efficient group signature schemes for large groups. Proceedings of Crypto'97, volume 1296 of LNCS, pages 410-424, Springer-Verlag, 1997.

[5] K. Q. Nguyen, J. Traoré. An Online Public Auction Protocol Protecting Bidder Privacy. Information Security and Privacy, 5$^{th}$ Australasian Conference-ACISP 2000, pages 427-442. Springer-Verlag, 2000.

[6] J. Camenisch, U. Maurer, M. Stadler. Digital payment systems with passive anonymity-revoking trustees. Proceedings of ESORICS'96, volume 1146 of LNCS, pages 33-43, Springer-Verlag, 1996.

[7] J. Camenisch, U. Maurer, M. Stadler. Digital payment systems with passive anonymity-revoking trustees. Journal of Computer Security, vol. 5, number 1, IOS Press, 1997.

[8] A. de Solages, J. Traoré. An Efficient fair off-line electronic cash system with extensions to checks and wallet with observers. Proceedings of Financial Crypto'98, volume 1465 of LNCS, pages 275-295, Springer-Verlag, 1998.

[9] A. de Solages and J. Traoré., Procédé de signature numérique juste, no. 98 02197, CNET/02959, filed Fe. 24, 1998.

[10] Y. Frankel, Y. Tsiounis, M. Yung. Indirect discourse proofs: achieving fair off-line electronic cash. Proceedings of Asiacrypt'96, volume 1136 of LNCS, pages 244-251. Springer-Verlag, 1996.

[11] Y. Frankel, Y. Tsiounis and M. Yung. Fair off-line cash made easy. Proceedings of Asiacrypt'98, volume 1514 of LNCS. Springer-Verlag, 1998.

[12] KOBAYASHI K; MORITA H. Efficient sealed-bid auction by using one-way functions. IEICE Transactions on fundamentals of electronics, communications and computer sciences. Institute of Electronics Information and Comm. Eng., vol. e84-A, no.1, 1 January 2001 (2001-01-01), pages 289-294.

[13] SUZUKI K; KOBAYASHI K; MORITA H. Efficient sealed-bid auction using hash chain. Information Security and Cryptology—ICISC 2000. Third International Conference. Proceedings (lecture notes in computer science, vol. 2015, Spring-Verlag), 9 Dec. 2000 (2000-12-09), pages 183-191.

[14] BYOUNGCHEON LEE; KWANGJO KIM; JOONG-SOO MA. Efficient public auction with one-time registration and public verifiability. Indocrypt 2001, Second International Conference on Cryptology in India, 16-20 Dec. 2001, pages 162-174.

The invention claimed is:

1. A method of accessing a service with authentication and revocable anonymity, comprising the steps of:
   i) identifying and registering a client and providing the client with means for authenticating the client to an anonymous certification authority;
   ii) authenticating the client to the anonymous certification authority using the means provided in step i) and supplying the client with an anonymous certificate associated to a public key and configured to enable the client to authenticate the client anonymously to a server;
   iii) the client calculating data formed as a series of tokens, wherein an initialization token of the series of tokens is configured to enable an authentication session to be opened and tokens of the series of tokens other than the initialization token are configured to enable the authentication session to be maintained;
   iv) authenticating the client by producing an anonymous signature of the initialization token, the signatures being obtained using a private key associated with said public key and opening an anonymous authentication session with the server, wherein said anonymous signature is a unique signature used for said authentication session;
   v) maintaining the anonymous authentication session with the aid of the series of tokens, thereby enabling the server to prove each of the actions of the client; and
   vi) selectively allowing contact between the server and the anonymous certification authority to revoke the anonymity of the client using the anonymous signature provided in step iv.

2. The method according to claim 1, further comprising: effecting communication between the anonymous certification authority and the server, before the authenticating of the client to the anonymous certification authority, whereby the server presents to said anonymous certification authority a request to obtain means enabling verification of the anonymous authentication supplied by a client.

3. The method according to claim 1, wherein each of the tokens of the series of tokens is configured for one-time use and each of the tokens of the series of tokens is strongly interdependent.

4. The method according to claim 3, wherein a first token $W_i$ of the series of tokens is obtained by applying a hashing function H to a random number, a second token $W_2$ of the series of tokens is obtained by applying the hashing function to the first token obtained, and so on until a token of rank n of the series of tokens defines the initialization token $W_n$ as:

$$H(W_0) = {}^{W_1}H)(W_{n-1}) = W_n.$$

5. The method according to claim 4, wherein on each new authentication the client sends the server a token of the series of tokens of at least one unit lower rank than that previously used.

6. The method according to claim 4, wherein on each new authentication the client sends the server a token $W_i$ of the series of tokens whose rank (i) is representative of a value of an operation.

7. The method according to claim 6, wherein the rank is representative of a number of bid increments.

8. The method according to claim 4, wherein the steps are applied to bidding and steps of the client submitting an increased bid are effected by sending successive tokens of lower rank.

9. The method according to claim 1, wherein the tokens of the series of tokens are calculated using two cryptographic primitives.

10. The method according to claim 9, wherein the two cryptographic primitives are a hashing function and a random number.

11. The method according to claim 1, further comprising using a group signature by associating a plurality of identifiers and respective private keys with a single group public key.

12. The method according to claim 11, wherein a power to revoke anonymity is shared between two or more authorities.

13. The method according to claim 1, wherein the anonymous signature is a blind signature.

14. A system adapted to open and maintain an anonymous authentication session with revocable anonymity, the system comprising:
- an identifier configured to identify and register a client and to provide the client with means for authenticating the client to an anonymous certification authority;
- an authentication device configured to authenticate the client to the anonymous certification authority using the authenticating means and to supply the client with an anonymous certificate associated to a public key and configured to enable the client to authenticate the client anonymously to a server;
- a calculator configured to calculate data formed as a series of tokens, wherein an initialization token of the series of tokens is configured to enable an authentication session to be opened and tokens of the series of tokens other than the initialization token are configured to enable the authentication session to be maintained;
- a producer for producing an anonymous signature of the initialization token, the signatures being obtained using a private key associated with said public key and opening an anonymous authentication session with the server, wherein said anonymous signature is a unique signature used for said authentication session to authenticate the client;
- wherein the anonymous authentication session is maintained with the aid of the series of tokens, thereby enabling the server to prove each of the actions of the client; and
- wherein selective contact is provided between the server and the anonymous certification authority to revoke the anonymity of the client using the anonymous signature.

15. The system according to claim 14, wherein the calculator calculates the series of tokens based on two cryptographic primitives, wherein the two cryptographic primitives are a hashing function and a random number.

16. The system according to claim 14, wherein the system is configured to use a group signature by associating a plurality of identifiers and respective private keys with the public key being a single group public key.

17. The system according to claim 14, wherein the unique anonymous signature is a blind signature.

18. The system according to claim 14, wherein power to revoke anonymity is divided between two or more authorities.

* * * * *